Dec. 5, 1961     M. P. BARRETT     3,012,119

OFFSET ARM MOTOR PROTECTOR

Filed Sept. 9, 1958

*INVENTOR.*
MARTIN P. BARRETT

BY

ATTYS.

United States Patent Office 3,012,119
Patented Dec. 5, 1961

3,012,119
OFFSET ARM MOTOR PROTECTOR
Martin P. Barrett, Parma, Ohio, assignor to Mechanical Industries Production Company, Akron, Ohio, a corporation of Ohio
Filed Sept. 9, 1958, Ser. No. 759,991
4 Claims. (Cl. 200—113)

The present invention relates to motor protectors of the type especially adapted to protect split phase motors of fractional horse power and their operating circuits. The protectors are particularly adapted for controlling motor operation within safe predetermined temperature limits both for starting and running conditions.

Many fractional horse power motors of the split phase type are in wide commercial use today. The characteristics of these motors are that they start rapidly under high electrical currents and run properly while drawing relatively small currents. Thus, for example, a small fractional horse power motor may draw as much as 45 amperes to start and such current may flow from a fraction of a second to 5 to 7 seconds, and thereafter the operating circuit conditions in the split phase motor changes so that the low resistance starting winding has a higher resistance running winding substituted therefor.

Motor protectors of this general type have been provided heretofore but it is very difficult to build into such protector proper mechanical design and operating characteristics so that the motor protector will function under required temperature or control conditions for both the high amperage starting currents and for the low amperage operating currents and still retain the controlled motor within desired temperature ranges.

One problem that exists in conventional types of motor protectors of the type to which the present invention relates is that the initial surge of starting current causes the bi-metal to start to curve or move into the space normally occupied by the shunt protector strip. However, the initial starting current also has so heated the shunt conductive strip as to cause it to move to an arcuate shape. Then as the shunt strip returns to normal straight form as running current is set up in the motor, such shunt returns to its normal position faster than the bi-metal strip which is of a slower reaction time due to normally a larger mass in the bi-metal strip and causes the thermostat to open and thus stop the motor. When one changed the relative positions of the shunt strip and bi-metal strip to obtain satisfactory operating conditions immediately after the starting current conditions, then the motor protector had the arms thereof positioned so far apart that circuit opening action under other undesired temperature conditions would not be properly obtained.

It is the general object of the present invention to provide a novel and improved type of a motor protector characterized by the ability of the protector to maintain proper circuit control characteristics under both high initial starting currents and under low amperage motor operating current conditions.

Another object of the invention is to provide a thermally shaded motor protector wherein a shunt connector strip is provided and it is associated with a bi-metal control strip whereby the motor protector circuit will be opened under predetermined temperature conditions, but where high but temporary initial starting currents passing through the shunt connector strip will not immediately influence the bi-metal strip to cause distorition thereof and consequent circuit opening action.

A further object of the invention is to provide a motor protector where a thermal balance has been achieved between the shunt strip and the bi-metal strip by relative internal spacing of such members to provide both proper motor staring and operating conditions in the protector.

Yet another object of the invention is to provide a shunt conductive strip in a motor protector having a cantilever type bi-metal strip extending thereinto for contact with the shunt strip for motor circuit opening action and where such shunt strip is laterally offset or spaced from the bi-metal strip for a major portion of, or a lengthy section intermediate the ends of, such bi-metal strip.

A further object of the invention is to provide a motor protector strip that is adapted to elongate in a motor protector rather than curve under high initial starting currents in a motor circuit.

The foregoing and other objects and advantages of the invention will be made more apparent as the specification proceeds.

For a better understanding of the present invention, reference now is directed to the accompanying drawings, wherein.

When referring to corresponding members shown in the drawings and referred to in the specification, corresponding numerals are used to facilitate comparison between such equivalent, or similar members.

Figure 1:
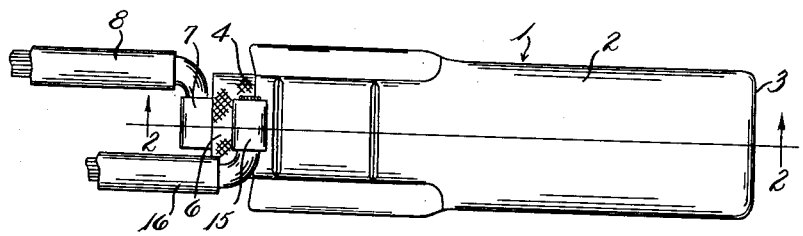
FIG. 1 is a top plan view of a motor protector embodying the principles of the invention.

In general, the invention relates to a motor protector or the like comprising an electrically conductive casing having an open and a closed end, a contact member secured to the casing on the inner surface thereof adjacent the closed end thereof, a relatively heavy bi-metal strip secured to the casing in insulated relation thereto at the open end thereof, the bi-metal strip having a cantilever section extending into the casing normally substantially parallel to the longitudinal axis thereof and terminating short of the contact member, a shunt strip secured against the bi-metal strip in insulated relation to the casing at the open end thereof, the shunt strip having a cantilever section extending into the casing and protruding beyond the end of the bi-metal strip, and contact means carried by the shunt strip to engage the contact member to make and break a circuit therewith, the bi-metal strip being movable under predetermined temperature to a curved shape to bear against the shunt strip adjacent the free end thereof and move it and the contact means away from the contact member, the shunt strip having a section therein offset from the bi-metal strip to insulate the bi-metal strip from the shunt strip.

With particular reference to the details of the structure shown in the accompanying drawings, attention now is directed to a motor protector, indicated as a whole by the numeral 1. This motor protector of the invention is made from or includes a casing 2 made from electrical and heat-conductive ductile metal such as copper, or copper alloy, and which casing 2 has a closed end 3 and an initially open end 4. The casing is of generally tubular construction and usually has substantially parallel, flat top and bottom surfaces thereon formed in, for example, by very highly cold-working the casing in a deep drawing operation to form the closed end 4 therein. The details of such casing are described in Alton R. Wells and Russell L. Schwing co-pending patent application Serial No. 751,705, and such casing makes no part of the present invention.

A strip 5 of bi-metal extends into the casing 2 from the normally open end 4 thereof and has a cantilever section provided therein by securing the axially outer end or other sectional portion of the bi-metal strip 5 to the casing 2. Thus a tubular sleeve 6, or equivalent insulating member, is used to insulate such bi-metal strip 5 from the casing 2 and which sleeve or similar insulation unit can be made from silicon compounded impregnated and braided Fiberglas. A suitable terminal receiving strip 7 preferably is welded to the bi-metal strip 5 and engages one of the terminal leads 8 of the motor protector.

Figure 2:
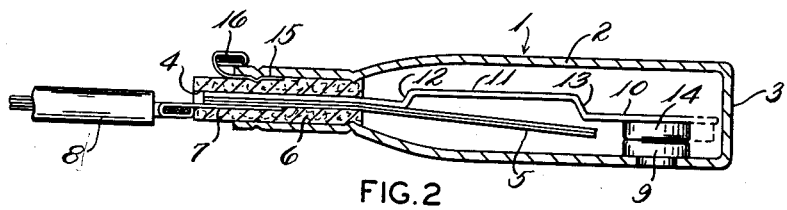
FIG. 2 is a vertical section through the enlarged motor protector of FIG. 1 and taken on line 2—2 thereof showing the elements in their circuit closed condition.
Figure 3:
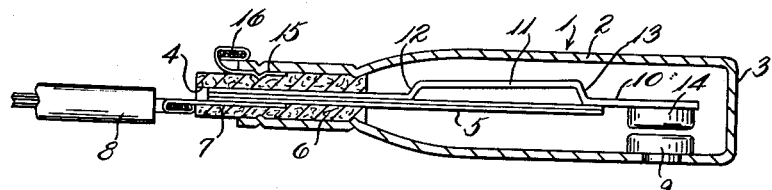
FIG. 3 is a vertical section like FIG. 2 but with the motor protector being shown in its circuit open position.

The conductive casing 2 preferably has a conventional electrical contact or contact member 9, secured thereto as by welding or otherwise, adjacent the closed end 3 thereof on the inner surface of such casing. FIGS. 2 and 3 of the drawings clearly bring out that such contact 9 is axially spaced from the free end of the cantilever section of the bi-metal strip 5.

As an important feature of the invention, a conductive shunt strip or element 10 is also provided in the motor protector 1 and is of a special design to provide the motor protector 1 of the invention with desired operating properties. This shunt strip 10 normally is welded to the bi-metal strip 5 at the end thereof secured in the open end of the casing 2 for providing effective electrical engagement between the shunt strip 10 and the lead 8. Hence the shunt strip 10 likewise has a cantilever section extending into the interior of the casing 2 and it is an important feature of the invention that the shunt strip 10 is provided with a section 11 therein intermediate the ends thereof that is offset from the bi-metal strip 5 a short distance. Such section 11 is generally parallel to the bi-metal strip 4 in its normal straight form extending into the casing of the motor protector. It also will be seen from FIGS. 2 and 3 of the drawings that the section 11 of the shunt strip 10 is connected to the remainder of the shunt strip by short, substantially equal length portions 12 and 13 diverging with relation to each other and forming obtuse angles with the axis of the shunt strip 10 and with the section 11 provided in the shunt strip. The drawing clearly shows that the bi-metal strip 5 extends into the casing 2 past the section 11 and portions 12 and 13 of the shunt strip 10. A conventional contact 14 is suitably secured to the free end of the cantilever section of the shunt strip 10 and such contact 14 is positioned for electrical circuit engagement with the contact 9 for make and break action therewith depending upon the operating temperature conditions to which the motor protector 1 is subjected and with relation to the calibration of the motor protector 1.

The motor protector 1 has the initially open end 4 thereof preferably closed by suitable staking and notching operations as described in previous U.S. Patents Nos. 2,497,397 and 2,586,309. Such operations bend the bi-metal strip 4 and the shunt strip 14 as shown in FIG. 2. Proper temperatures will produce a change in the shape of the strip 5 for circuit opening action.

Any suitable terminal or connector strip 15 is pressed against or welded to the casing 2 at the initially open end 4 thereof and extends therefrom to engage a second power or circuit lead 16 conventionally connected to such strip 15.

In the motor protector 1 of the invention, it should be realized that any conventional control strip for use in temperature sensitive units can be used in place of the bi-metal strip 5 described herein, and it should be understood that the contacts 9 and 14 can be of any known construction, as desired. In some instances, it may even be desired to make contact means integral with the strips 5 and the shunt strip 10, or the contact may be formed on or integral with the casing 2.

By the design of the motor protector provided by the present invention, the initial heavy starting current passing through the shunt strip 10 when the motor protector 1 is connected in a starting winding circuit of a split phase fractional horse power motor will cause such shunt strip to elongate as indicated in dotted lines in FIG. 2, but with such shunt strip 10 still positioning the contact 14 in good electrical engagement with the contact 9 on the casing 2. The heating action effected on the shunt strip 10 by the high starting current does not immediately thermally effect the bi-metal strip 5 because the shunt strip 10 is offset with relation to the bi-metal strip for a major portion of the length of such associated, usually parallel strip means. However, the heating action of the shunt strip 10 on the bi-metal strip 5 opens the electrical circuit with much less thermal lag when the current is increased than would be the case if the thermostat action were based completely upon normal currents and external heating conditions, and it can open at room temperatures under heavy current.

Normally the shunt strip 10 is of a relatively light weight or size, especially in cross sectional area, with relation to the bi-metal strip 5. Such shunt strip can be made from any desired metal and Inconel is one suitable material that can be used. The strip 10 may be of any desired width and thickness that is practical in small in size motor protectors to which the present invention relates. Variations in the size of the strip 10 are used for substantially varying the properties of the motor protector 1. It will be realized that in the drawing, the motor protector 1 of the invention has been shown in enlarged form and that these motor protectors frequently are only of an inch to an inch and a quarter in length and may, for example, be of substantially a quarter of an inch in diameter, or width.

The shunt strip 10 may be positioned in the casing 2 in any desired manner but would be insulated therefrom by means closing or sealing the initially open end of the casing.

By operating tests of motor protectors made in accordance with the invention, it has been found that very satisfactory operating characteristics are provided thereby. The motor protector 1 keeps a controlled motor under locked rotor conditions at temperatures at or below a maximum safe temperature limit for the insulations normally used for any substantial periods of time. In addition to the above, the thermal time delay of this design of the motor protector 1 permits a motor to restart and operate with the usual heavy initial inrush current even when the motor is at a high temperature which is just below the maximum temperature cut-out point. Thus it is believed that the objects of the invention have been achieved and that a novel and improved thermostat and motor protector unit has been provided by the invention.

While one complete embodiment of the invention has been disclosed herein, it will be appreciated that modification of this particular embodiment of the invention may be resorted to without departing from the scope of the invention as defined in the appended claims.

What is claimed is:

1. A motor protector or the like comprising an electrically conductive casing having an initially open and a permanently closed end, a contact member secured to said casing on the inner surface thereof adjacent the closed end thereof, a bi-metal strip secured to said casing in insulated relation thereto at the open end thereof, said bi-metal strip having a cantilever section extending into said casing normally substantially parallel to the longitudinal axis thereof and terminating short of said contact member, a shunt strip secured against said bi-metal strip in insulated relation to said casing at the initially open end thereof, said shunt strip having a cantilever section extending into said casing and protruding beyond the end of said bi-metal strip, and contact means carried by said shunt strip to engage said contact member to make and break a circuit therewith, said shunt strip comprising the current carrying member in the motor protector, said bi-metal strip being movable under predetermined temperature to a different shape to bear against said shunt strip adjacent the free end thereof and move it and said contact means away from said contact member, said shunt strip for the major portion of the length of said cantilever section of said bi-metal strip being offset from and generally parallel to said bi-metal strip to insulate said bi-metal strip from heat in said shunt strip and avoid rapid heating of said bi-metal strip by high currents temporarily flowing in said shunt strip.

2. In a motor protector or the like, a casing having an open and a closed end, a flat surfaced contact member positioned in said casing adjacent the closed end thereof, a bi-metal strip secured to said casing in insulated relation thereto at the initially open end thereof, said bi-metal strip having a cantilever section extending into said casing and terminating short of said contact member, a shunt strip secured to and extending into but insulated from said casing, said shunt strip having a cantilever section extending into said casing and protruding beyond the end of said bi-metal strip, and flat surfaced contact means carried by said shunt strip to engage the flat surface of said contact member to make and break a circuit therewith, said bi-metal strip being movable under predetermined temperature to a curved shape to bear against said shunt strip adjacent the free end thereof and move it and said contact means away from said contact member, said shunt strip having a section therein offset from and parallel to said bi-metal strip for the major portion of the length of said cantilever section of said bi-metal strip to insulate said bi-metal strip from heat generated in said shunt strip and reduce the speed of heat flow from said shunt strip to said bi-metal strip.

3. A motor protector or the like comprising an electrically conductive casing having an initially open and a permanently closed end, a flat surfaced contact member secured to said casing on the inner surface thereof adjacent the closed end thereof, a bi-metal strip secured to said casing in insulated relation thereto at the open end thereof, said bi-metal strip having a cantilever section extending into said casing normally substantially parallel to the longitudinal axis thereof and terminating short of said contact member, a shunt strip secured against said bi-metal strip in insulated relation to said casing at the initially open end thereof, said shunt strip having a cantilever section extending into said casing and contacting said bi-metal strip and protruding beyond the end of said bi-metal strip, and flat surfaced contact means carried by said shunt strip to engage said contact member to make and break a circuit therewith, said bi-metal strip being movable under predetermined temperature to a different shape to bear against said shunt strip adjacent the free end thereof and move it and said contact means away from said contact member, said shunt strip having a portion of the cantilever section thereof offset from said bi-metal strip to insulate said bi-metal strip from heat generated in said shunt strip by electrical currents flowing therethrough, said shunt strip being of a shape to elongate when heated to retain said contact member and contact means in contact between the flat surfaces thereof.

4. In a motor protector or the like, a casing having an open and a closed end, a flat surfaced contact member positioned in said casing adjacent the closed end thereof, a bi-metal strip secured to said casing in insulated relation thereto at the initially open end thereof, said bi-metal strip having a cantilever section extending into said casing and terminating short of said contact member, a shunt strip secured to and extending into but insulated from said casing, said shunt strip secured to and extending into but insulated from said casing, said shunt strip having a cantilever section extending into said casing and protruding beyond the end of said bi-metal strip, and flat surfaced contact means carried by said shunt strip to engage the flat surface of said contact member to make and break a circuit therewith, said bi-metal strip being movable under predetermined temperature to a curved shape to bear against said shunt strip adjacent the free end thereof and move it and said contact means away from said contact member, said shunt strip having a section therein offset from and parallel to said bi-metal strip to insulate said bi-metal strip from heat generated in said shunt strip and reduce the speed of heat flow from said shunt strip to said bi-metal strip, said offset shunt strip section being connected to the remainder of said shunt strip by short diverging portions, said shunt strip elongating when heated.

References Cited in the file of this patent
UNITED STATES PATENTS

| | | |
|---|---|---|
| 1,497,315 | Appelberg | June 10, 1924 |
| 1,901,775 | Reichold | Mar. 14, 1933 |
| 2,199,638 | Lee | May 7, 1940 |
| 2,421,538 | Clark | June 3, 1947 |
| 2,716,682 | Franklin | Aug. 30, 1955 |
| 2,773,962 | Perst | Dec. 11, 1956 |
| 2,855,485 | Webking | Oct. 7, 1958 |